(12) United States Patent
Yagishita et al.

(10) Patent No.: US 6,683,990 B2
(45) Date of Patent: Jan. 27, 2004

(54) IMAGE DATA ENCODING APPARATUS

(75) Inventors: Takahiro Yagishita, Kanagawa (JP); Nekka Matsuura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/308,117

(22) Filed: Dec. 3, 2002

(65) Prior Publication Data

US 2003/0128881 A1 Jul. 10, 2003

Related U.S. Application Data

(63) Continuation of application No. 09/455,923, filed on Dec. 7, 1991, now Pat. No. 6,507,674.

(30) Foreign Application Priority Data

Dec. 14, 1998 (JP) ............................................ 10-375463

(51) Int. Cl.[7] ............................. G06K 9/36; G06K 9/96
(52) U.S. Cl. ....................................... 382/239; 382/240
(58) Field of Search ................................. 382/239, 243, 382/240, 232, 234, 248, 176; 375/240.02, 240.08, 240.1, 240.11, 240.18, 240.19, 240.24; 348/398.1, 403.1, 420.1

(56) References Cited

U.S. PATENT DOCUMENTS

| | | | |
|---|---|---|---|
| 5,933,249 A | 8/1999 | Shimura et al. | 382/239 |
| 6,014,464 A * | 1/2000 | Kurzweil et al. | 382/233 |
| 6,141,446 A | 10/2000 | Boliek et al. | 382/233 |
| 6,236,757 B1 | 5/2001 | Zeng et al. | 382/240 |

FOREIGN PATENT DOCUMENTS

| | | | |
|---|---|---|---|
| JP | 2-137475 | 5/1990 | H04N/1/41 |
| JP | 4-322562 | 11/1992 | H04N/1/41 |

OTHER PUBLICATIONS

U.S. patent application Ser. No. 09/565,545, filed May 5, 2000, pending.
U.S. patent application Ser. No. 10/308,117, filed Dec. 3, 2002, pending.

* cited by examiner

Primary Examiner—Timothy M. Johnson
(74) Attorney, Agent, or Firm—Oblon, Spivak, McClelland, Maier & Neustadt, P.C.

(57) ABSTRACT

An image data encoding apparatus includes a wavelet transform unit which produces a first subband coefficient and a second subband coefficient as an output in response to each of blocks of the input image data, the first and second subband coefficients being produced by performing a multiple decomposition process in which only the first subband coefficient is further decomposed. A first text transform unit produces an intensity coefficient of a first kind as well as a set of coefficients of a second kind as an output in response to each block, the intensity coefficient including significant bits, and only the intensity coefficient being further decomposed in the first text transform unit. A second text transform unit produces a set of coefficients of the second kind as an output in response to each block, one of the coefficients of the second kind including significant bits but not being further decomposed. A selector selects one of the output of the wavelet transform unit, the output of the first text transform unit and the output of the second text transform unit, as an input to an entropy coder, in accordance with a combination of an area-discriminating signal and a text-transform control signal.

2 Claims, 8 Drawing Sheets

FIG. 4 A

WAVELET TRANSFORM

| 80 | 60 |
|---|---|
| 70 | 50 |

AREA BIT AND HH : 0,0  HH  [0|0|0|0|0|0|0|0|0|0]
LH : 20  LH  [0|0|0|0|1|0|1|0|0]
HL : 10  HL  [0|0|0|0|0|1|0|1|0]
LL : 65  LL  [0|1|0|0|0|0|0|1]

FIG. 4 B

TEXT TRANSFORM-A

| 80 | 0 |
|---|---|
| 80 | 0 |

AREA BIT, BACKGROUND,
AND TAIL-END BIT :1,0,0  HH  [1|0|0|////////]
LOCATION :1010  LH  [1|0|1|0|//////]
(NONE)  HL  [////////////]
INTENSITY : 80  LL  [0|1|0|1|0|0|0|0]

FIG. 4 C

TEXT TRANSFORM-B

| 80 | 0 |
|---|---|
| 80 | 0 |

AREA BIT, BACKGROUND,
AND TAIL-END BIT :1,0,1  HH  [1|0|1|////////]
LOCATION :1010  LH  [1|0|1|0|//////]
INTENSITY : 80  HL  [0|1|0|1|0|0|0|//]
(NONE)  LL  [////////////]

FIG. 5

| | FIRST SUBBAND COEFFICIENT | SECOND SUBBAND COEFFICIENTS | | |
|---|---|---|---|---|
| | LL | LH | HL | HH |
| WAVELET TRANSFORM | SUBBAND LL | SUBBAND LH | SUBBAND HL | SUBBAND HH |
| TEXT TRANSFORM-A | INTENSITY | NONE | LOCATION | BACKGROUND AND TAIL-END |
| TEXT TRANSFORM-B | NONE | INTENSITY | LOCATION | BACKGROUND AND TAIL-END |

ABCDE abcdefg hijklmn
opqrstu vwxyz
important abcdefg
hijklmn opqrstu

ABCDE abcdefg hijklmn
opqrstu vwxyz
important abcdefg
hijklmn opqrstu

ABCDE

ABCDE abcdefg hijklmn
opqrstu vwxyz
important abcdefg
hijklmn opqrstu

ABCDE important

ABCDE

TEXT AREA FOR 1ST AND 2ND DECOMPOSITION LEVELS

TEXT AREA FOR 3RD DECOMPOSITION LEVEL

TEXT AREA FOR 4TH DECOMPOSITION LEVEL

IMAGE DATA ENCODING APPARATUS

This application is a continuation of application Ser. No. 09/455,923 filed on Dec. 7, 1999, now U.S. Pat. No. 6,507,674.

BACKGROUND OF THE INVENTION (1) Field of the Invention

The present invention relates to an image data encoding apparatus which is capable of progressive transmission of an image.

(2) Description of the Related Art

When transmitting an original high-resolution image, such as a home page image, over the Internet, the progressive transmission algorithm is most commonly used. In the home page image, text data and picture or photographic data, both represented by bit maps, often coexist. Although the bit-map representation of text or characters is not efficient for the transmission, the bit-map representation of the home page image is needed for the progressive transmission because the receiver equipment does not always include the fonts that are exactly the same as the fonts in the transmitter equipment.

In progressive transmission of an image, a low resolution representation of the image is first sent. This low resolution representation requires very few bits to encode. The image is then updated, or refined, to the desired fidelity by transmitting more and more information. To encode an image for progressive transmission, it is necessary to create a sequence of progressively lower resolution images from the original higher resolution image. The JBIG specification recommends generating one lower resolution pixel for each two by two block in the higher resolution image.

When a home page image is transmitted over the Internet by the progressive transmission and displayed on the receiver equipment, the operator on the display of the receiver equipment can quickly recognize the contents of the received image. If the received image is not the desired one, the operator can quit the receiving of the image and the time and cost for the transmission between the transmitter and the receiver can be saved.

The JBIG algorithm proposed by the Joint Bilevel Image Experts Group defines a standard for the progressive encoding of bilevel images (see ISO/IEC International Standard 11544; ITU-T T.82). The progressive reduction standard (PRES) of the JBIG is essentially a progressive scheme that encodes a bilevel image by creating representations at lowering resolutions in a bottom-up manner. Resolution is halved at every stage. The image is then transmitted in a top-down manner, that is, lower resolutions first. Resolution reduction is done by using a block of pixels in the higher resolution image and pixels already encoded in the lower resolution image. These values are used as an index into a predefined lookup table that can be specified by the user.

Japanese Laid-Open Patent Application No.2-137475 discloses a multi-resolution encoding method for the progressive transmission. This encoding method is aimed at reducing the amount of bits required to be encoded. In the encoding method of the above publication, the highest resolution image which requires the largest amount of bits to encode is transformed into a bilevel image. The highest resolution image is reconstructed on the receiver equipment by using the pixels in the bilevel image and pixels in the second highest resolution image.

Japanese Laid-Open Patent Application No.4-322562 discloses a multi-resolution encoding method for the progressive transmission. This encoding method is aimed at increasing the efficiency of the multi-resolution encoding. In the encoding method of the above publication, an original high resolution image is divided into edge portions and the remaining portions. Only the edge portions of the original image are transformed into bilevel image data, and the difference pixels between the original image and the bilevel image are created. The bilevel image data and the difference pixels are separately encoded by using suitable encoding schemes that are different from each other. The efficiency of the multi-resolution encoding is thus increased.

Generally, when the bit-map representation of characters is transmitted by using the progressive transmission, the characters in the reconstructed images from early stages of the transmission on the receiver equipment are often not readable to a human viewer or the operator on the receiver equipment. From the point of view of speedy recognition of the received image, the time and cost for the progressive transmission of the bit-map representation of the unreadable characters are not contributory but detrimental.

The PRES method of the JBIG is a progressive scheme that encodes a bilevel image, and it creates representations at lowering resolutions in a bottom-up manner regardless of whether or not the received image is readable on the receiver equipment. Hence, the PRES method does not eliminate the above-mentioned problem.

The encoding method of Japanese Laid-Open Patent Application No.2-137475 is useful only for the saving of the time and cost for the transmission of the highest resolution image but not contributory to the saving of the time and cost for the transmission of the lower resolution images. Hence, the method of the above publication does not cure the shortcomings of the PRES method.

The encoding method of Japanese Laid-Open Patent Application No.4-322562 requires the division of the original image into the edge portions and the remaining portions, and the amount of bits required to be encoded is considerably increased which causes the time for the transmission of the entire image to be increased. Further, the hardware which is needed for implementing the encoding method of the above publication is complicated, which will raise the cost for the hardware. Hence, the method of the above publication also does not cure the shortcomings of the PRES method.

As described above, when a conventional multi-resolution encoding method is used for encoding the bit-map representation of characters, the inclusion of unreadable-character bits in the lower resolution images before they are transmitted to the receiver equipment is considerably probable. This causes the increase of the amount of unreadable-character bits needed for the progressive transmission, and this is detrimental to speedy searching and recognition of reconstructed images obtained by the progressive transmission. A detailed description will now be given of the above-mentioned problems of the conventional multi-resolution encoding method with reference to FIG. 6A through FIG. 6C.

FIG. 6A, FIG. 6B and FIG. 6C show results of reconstructed images from the coded data produced by a conventional multi-resolution encoding method.

Specifically, FIG. 6A show a result of a reconstructed image based on the entire coded data of an original high-resolution image in which a photograph area and a text area coexist. FIG. 6B shows a result of a reconstructed low-resolution image based on only the fourth-level coded data and the low-frequency coded data of the original image.

FIG. 6C shows a result of a reconstructed lower-resolution image based on only the low-frequency coded data of the original image.

For example, the reconstructed image of FIG. 6A has a resolution of 75 dpi (dots per inch), and the reconstructed image of FIG. 6C has a resolution of 37.5 dpi. In the conventional multi-resolution encoding method, it is possible to selectively use a desired one of the encoding schemes such as those of FIG. 6B and FIG. 6C. That is, when displaying a reconstructed image on a low-resolution CRT (cathode-ray tube) display device the encoding scheme of FIG. 6B is selected, while when displaying a reconstructed image on a lower-resolution portable terminal the encoding scheme of FIG. 6C can be selected.

As shown in FIG. 6C, when the conventional multi-resolution encoding method is used, the characters in the text area of the reconstructed image are not easily readable to a human viewer. The conventional multi-resolution encoding method allows the inclusion of unreadable-character bits in the lower resolution image before the image is transmitted to the receiver equipment. This causes the increase of the amount of unreadable-character bits needed for the progressive transmission, and this is detrimental to speedy searching and recognition of the reconstructed image obtained by the progressive transmission.

Further, when viewing as a thumbnail for searching and recognition of a document, the document generally contains both important words and negligible words from the point of view of the searching and recognition. As shown in FIG. 6B, when the conventional multi-resolution encoding method is used, the characters in the text area of the reconstructed image may be readable to a human viewer, but both important words and negligible words with the same resolution are contained in the reconstructed image in a mixed manner. Hence, it is difficult that the reconstructed image obtained by the progressive transmission has appropriate readability for a specific purpose such as viewing as a thumbnail for searching and recognition.

SUMMARY OF THE INVENTION

An object of the present invention is to provide an improved image data encoding apparatus in which the above-described problems are eliminated.

Another object of the present invention is to provide an image data encoding apparatus which ensures speedy searching and recognition of reconstructed images obtained by the progressive transmission while avoiding the increase of the amount of unreadable-character bits needed for the transmission.

Another object of the present invention is to provide an image data encoding apparatus which enables the reconstructed images obtained by the progressive transmission to have appropriate readability for a specific purpose such as viewing as a thumbnail for searching and recognition.

The above-mentioned objects of the present invention are achieved by an image data encoding apparatus which produces compressed image data from input image data through a multi-resolution encoding in order to carry out a progressive transmission, the apparatus including: a wavelet transform unit which produces a first subband coefficient and a second subband coefficient as an output in response to each of blocks of the input image data, each block having a predetermined number of pixels, the first and second subband coefficients being produced by performing a multiple decomposition process in which only the first subband coefficient is further decomposed; a first text transform unit which produces an intensity coefficient of a first kind as well as a set of coefficients of a second kind as an output in response to each of the blocks of the input image data, the intensity coefficient including significant bits, and only the intensity coefficient being further decomposed in a multiple decomposition process of the first text transform unit; a second text transform unit which produces a set of coefficients of the second kind as an output in response to each of the blocks of the input image data, without producing no coefficient of the first kind, one of the coefficients of the second kind including significant bits but not being further decomposed; and a selector which selects one of the output of the wavelet transform unit, the output of the first text transform unit and the output of the second text transform unit, as an input to an entropy coder, in accordance with a combination of an area-discriminating signal and a text-transform control signal.

The image data encoding apparatus of the present invention makes it possible to suitably set one of the first text transform and the second text transform to a specific text area of the original image. The image data encoding apparatus of the present invention can avoid the inclusion of unreadable-character bits in the lower resolution images before the subsequent-level decomposition is performed. In the progressive transmission, the lower resolution images are first sent. Accordingly, by suitably setting one of the first text transform and the second text transform to a specific text area of the original image, the image data encoding apparatus of the present invention allows speedy searching and recognition of the reconstructed images obtained by the progressive transmission while avoiding the increase of the amount of the unreadable-character bits needed for the transmission. Further, the image data encoding apparatus of the present invention allows the reconstructed images obtained by the progressive transmission to have appropriate readability for a specific purpose such as viewing as a thumbnail for searching and recognition.

BRIEF DESCRIPTION OF THE DRAWINGS

Other objects, features and advantages of the present invention will become more apparent from the following detailed description when read in conjunction with the accompanying drawings in which:

FIG. 4A, FIG. 4B and FIG. 4C are diagrams for explaining respective layouts of coefficients for the wavelet transform, the text transform-A and the text transform-B which are applied to input image data; and FIG. 5 is a diagram for explaining the correspondence between the wavelet transform coefficients, the text transform-A coefficients and the text transform-B coefficients;

DETAILED DESCRIPTION OF THE PREFERRED EMBODIMENTS

A description will now be given of the preferred embodiments of the present invention with reference to the accompanying drawings.

Figure 1:
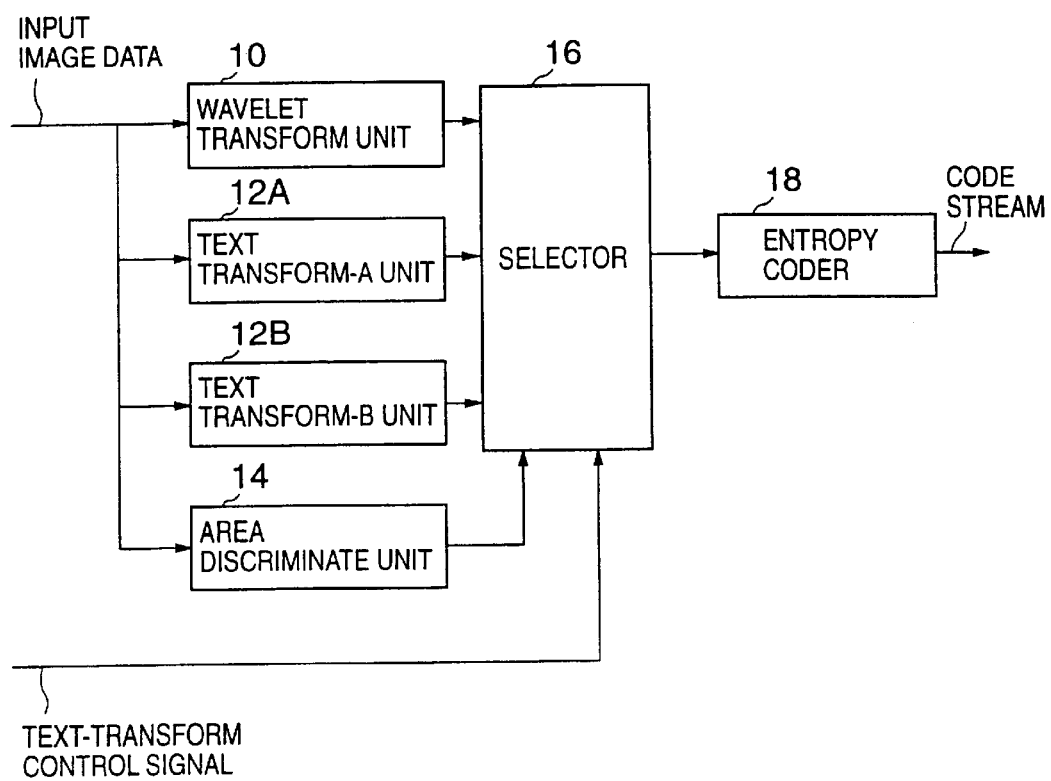
FIG. 1 is a block diagram of one embodiment of the image data encoding apparatus of the present invention.

FIG. 1 is a block diagram of one embodiment of the image data encoding apparatus of the present invention. As shown in FIG. 1, input image data is received by a wavelet transform unit 10. The output of the wavelet transform unit 10 is coupled to an input of a selector 16. Similarly, the input image data is received by each of a text transform-A unit 12A and a text transform-B unit 12B. The outputs of the text transform-A unit 12A and the text transform-B unit 12B are coupled to other inputs of the selector 16. Further, the input image data is received also by an area discriminating unit 14. The output of the area discriminating unit 14 is coupled to another input of the selector 16. Also, the output of the selector 16 is coupled to an input of an entropy coder 18.

For the sake of simplicity of description, suppose that in the present embodiment, the input image data is supplied to each of the elements 10, 12A, 12B and 14 in the form of blocks, each block consisting of 2×2 pixels. In response to each block, the area discriminating unit 14 produces a 1-bit area-discriminating signal indicative of whether or not the block meets the requirements that the number of different pixel values in the block is two or less, and at least one of the different pixel values in the block is the maximum or the minimum. The area-discriminating signal produced by the area discriminating unit 14 is received by the selector 16.

In a practical image data encoding system, input image data in the form of 16×16 blocks, each block consisting of, for example, 16×16 pixels, is supplied to the input of the practical system. One page of compressed image data produced by the practical system consists of, for example, 500×500 blocks. The entropy coder in the practical system produces a code stream as the result of image data encoding, which corresponds to one page for each of multi-resolution encoding levels. The practical system creates separate pages of compressed image data for the respective encoding levels, and can perform the progressive transmission of the compressed image data independently for each of such pages. It can be easily understood that the image data encoding apparatus of the present invention is applicable to such a practical system without departing from the scope of the present invention.

When a certain block in the input image data meets the above requirements, it is determined that the block is located in a text area of the original image. In this case, one of the output data of the text transform-A unit 12A or the output data of the text transform-B unit 12B is selected by the selector 16 in accordance with an ON-state area-discriminating signal (indicating the value "1"). On the other hand, when another block in the input image data does not meet the above requirements, it is determined that the block is located in a picture or photographic area of the original image. In this case, the output data of the wavelet transform unit 10 is selected by the selector 16 in accordance with an OFF-state area-discriminating signal (indicating the value "0").

Generally, in an original image, characters are very likely to be represented by its image portion including black pixels (which have the maximum pixel value) surrounded by white background pixels (which have the minimum pixel value) or by its image portion including white pixels (which have the minimum pixel value) surrounded by gray background pixels. Hence, the indication of the area-discriminating signal as to whether or not each block in the original image meets the above requirements for the text area discrimination can be used to exactly discriminate the text areas from the other image areas in the original image.

In response to the input from one of the elements 10, 12A and 12B, the selector 16 supplies at least one bit stream to the entropy coder 18. In the present embodiment, the selector 16 adds the 1-bit area-discriminating signal, as the area bit, to the data supplied from one of the elements 10, 12A and 12B. The bit stream with the area bit is then supplied from the selector 16 to the entropy coder 18. In response to the input from the selector 16, the entropy coder 18 produces a code stream as the result of image data encoding. Hence, the image data encoding apparatus of FIG. 1 creates compressed image data for the progressive transmission.

In the image data encoding apparatus of FIG. 1, one of the output data of the wavelet transform unit 10, the output data of the text transform-A unit 12A and the output data of the text transform-B unit 12B, is selected by the selector 16 in accordance with the area-discriminating signal supplied from the area discriminating unit 14 and in accordance with an externally supplied text-transform control signal, which will be described later.

Next, a description will be given of an operation of the wavelet transform unit 10 in the present embodiment of the image data encoding apparatus. In response to each block, the wavelet transform unit 10 produces a series of wavelet coefficients representing a multi-resolution decomposition of the image.

Given the samples of the input image data as x0 and x1, the transform performed by the wavelet transform unit 10 is a reversible wavelet transform which may be defined by the outputs y0 and y1 with an initial index "0", as follows:

$$y0(0) = \lfloor \{x(0)+x(1)\}/2 \rfloor$$

$$y1(0) = x(0)-x(1)$$

The simplest wavelet transform may be defined by the outputs with a general index "n", as follows:

$$LPF: s(n) = \lfloor \{x(2n)+x(2n+1)\}/2 \rfloor$$

$$HPF: d(n) = x(2n)-x(2n+1)$$

where s(n) denotes the output of a low-pass filter (LPF), and d(n) denotes the output of a high-pass filter (HPF). The notation $\lfloor \; \rfloor$ means to round down or truncate and is sometimes referred to as the floor function. Note that the factor of two in the transform coefficients addressing is the result of an implied subsampling by two. It is known that the transform is reversible.

Figure 2:
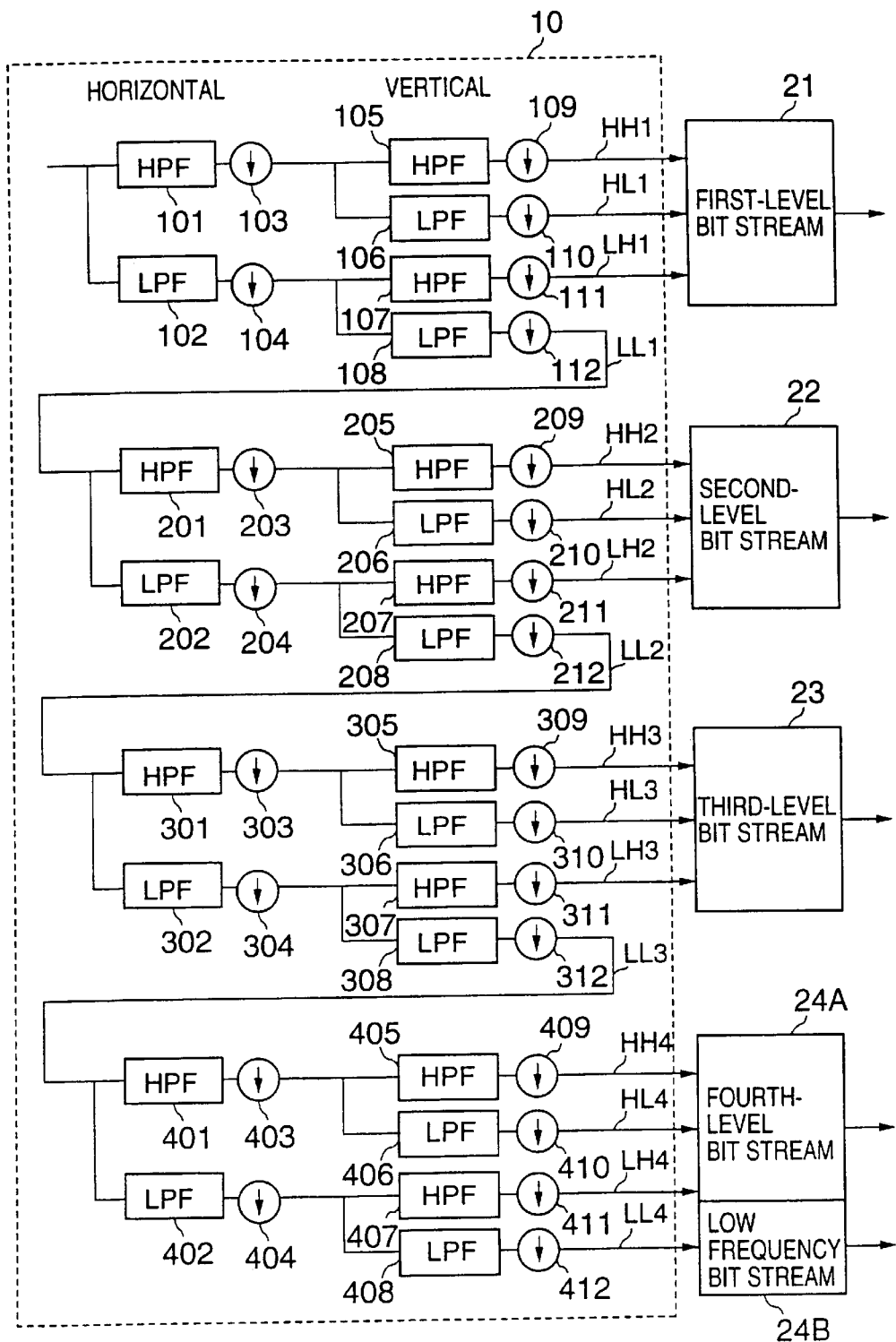
FIG. 2 is a diagram showing an example of a wavelet transform unit in the image data encoding apparatus.

FIG. 2 is a block diagram showing an example of the wavelet transform unit 10 in the image data encoding apparatus of FIG. 1. As shown in FIG. 2, the wavelet transform unit 10 in the present embodiment performs the process of multi-resolution decomposition on the input image data by using high-pass and low-pass filters. The number of levels of decomposition is variable and may be any number. In the present embodiment, however, the number of decomposition levels equals four levels.

In the block diagram of FIG. 2, the elements 12A, 12B, 14, 16 and 18 as in the image data encoding apparatus of FIG. 1 are omitted.

The most common way to perform the transform on two-dimensional data, such as an image, is to apply the one-dimensional filters separately, i.e., along the rows and then along the columns. The first level of decomposition leads to four different bands of coefficients, referred to herein as LL, HL, LH and HH. The letters stand for low (L) and high (H) corresponding to the applied filters. Hence, the LL band consists of coefficients from the low-pass filters in both row and column directions. It is a common practice to place the wavelet coefficients in the format as in FIG. 3.

Each subblock in a wavelet decomposition can be further decomposed. The most common practice is to only decompose the LL subblock further, but this can be done a number of times. Such a multiple decomposition is called pyramidal decomposition (see FIG. 3). The designation LL, LH, HL and HH and the decomposition level number denote each decomposition. By using known filters, pyramidal decomposition does not increase the coefficient size.

In the present embodiment, the reversible wavelet transform is recursively applied by the wavelet transform unit 10 to an image, and the first level of decomposition operates on the finest detail, or resolution. At a first decomposition level, the image is decomposed into four sub-images (e.g., sub-bands LL, HL, LH and HH). Each subband represents a band of spatial frequencies. The first level subbands are designated LL1, LH1, HL1 and HH1. The process of decomposing the original image involves subsampling by two in both horizontal and vertical dimensions, such that the first level subbands LL1, LH1, HL1 and HH1 each have one-fourth as many coefficients as the input has pixels (coefficients) of the image.

The subband LL1 contains simultaneously low frequency horizontal information and low frequency vertical information. Typically, a large portion of the image energy is concentrated in this subband. The subband LH1 contains low frequency horizontal and high frequency vertical information (e.g., horizontal edge information). The subband HL1 contains high frequency horizontal and low frequency vertical information (e.g., vertical edge information). The subband HH1 contains high frequency horizontal information and high frequency vertical information (e.g., texture or diagonal edge information).

Referring to FIG. 2, at the first decomposition level of the wavelet transform unit 10, the input image data is high-pass and low-pass filtered by a high-pass filter (HPF) 101 and a low-pass filter (LPF) 102 before being sub-sampled by two via down-samplers 103 and 104, respectively. A subsampled output signal from the down-sampler 103 is high-pass and low-pass filtered by a high-pass filter (HPF) 105 and a low-pass filter (LPF) 106 before being sub-sampled by two via down-samplers 109 and 110, respectively. Subband components HH1 and HL1 appear at respective outputs of the down-samplers 109 and 110. Similarly, a subsampled output signal from the down-sampler 104 is high-pass and low-pass filtered by a high-pass filter (HPF) 107 and a low-pass filter (LPF) 108 before being sub-sampled by two via down-samplers 111 and 112, respectively. Subband components LH1 and LL1 appear at respective outputs of the down-samplers 111 and 112.

Based on the subband components HH1, HL1 and LH1 output from the wavelet transform unit 10, the selector 16 (not shown in FIG. 2) supplies a first-level bit stream 21 to the entropy coder 18 (not shown in FIG. 2) for the image data encoding.

Similarly, in the wavelet transform unit 10, the second decomposition level circuit contains high-pass filters (HPF) 201, 205 and 207, low-pass filters (LPF) 202, 206 and 208, and down-samplers 203, 204, 209, 210, 211 and 212. Second-level subband components HH2, HL2, LH2 and LL2 appear at respective outputs of the down-samplers 209, 210, 211 and 212. The third decomposition level circuit of the wavelet transform unit 10 contains high-pass filters (HPF) 301, 305 and 307, low-pass filters (LPF) 302, 306 and 308, and down-samplers 303, 304, 309, 310, 311 and 312. Third-level subband components HH3, HL3, LH3 and LL3 appear at respective outputs of the down-samplers 309, 310, 311 and 312. The fourth second decomposition level circuit of the wavelet transform unit 10 contains high-pass filters (HPF) 401, 405 and 407, low-pass filters (LPF) 402, 406 and 408, and down-samplers 403, 404, 409, 410, 411 and 412. Fourth-level subband components HH4, HL4, LH4 and LL4 appear at respective outputs of the down-samplers 409, 410, 411 and 412.

Based on the subband components HH2, HL2 and LH2 output from the wavelet transform unit 10, the selector 16 supplies a second-level bit stream 22 to the entropy coder 18 for the image data encoding. Based on the subband components HH3, HL3 and LH3 output from the wavelet transform unit 10, the selector 16 supplies a third-level bit stream 23 to the entropy coder 18 for the image data encoding. Further, based on the subband components HH4, HL4 and LH4 output from the wavelet transform unit 10, the selector 16 supplies a fourth-level bit stream 24A to the entropy coder 18 for the image data encoding. Also, based on the subband component LL4 output from the wavelet transform unit 10, the selector 16 supplies a low frequency bit stream 24B to the entropy coder 18 for the image data encoding.

Each of the succeeding second, third and fourth lower decomposition levels is produced by decomposing the low frequency LL subband of the preceding level. The subband LL1 of the first level is decomposed to produce the subbands LL2, LH2, HL2 and HH2 of the moderate detail second level. Similarly, the subband LL2 is decomposed to produce the coarse detail subbands LL3, LH3, HL3 and HH3 of the third level. Also, the subband LL3 is decomposed to produce the coarser detail subbands LL4, LH4, HL4 and HH4 of the fourth level.

Figure 3:
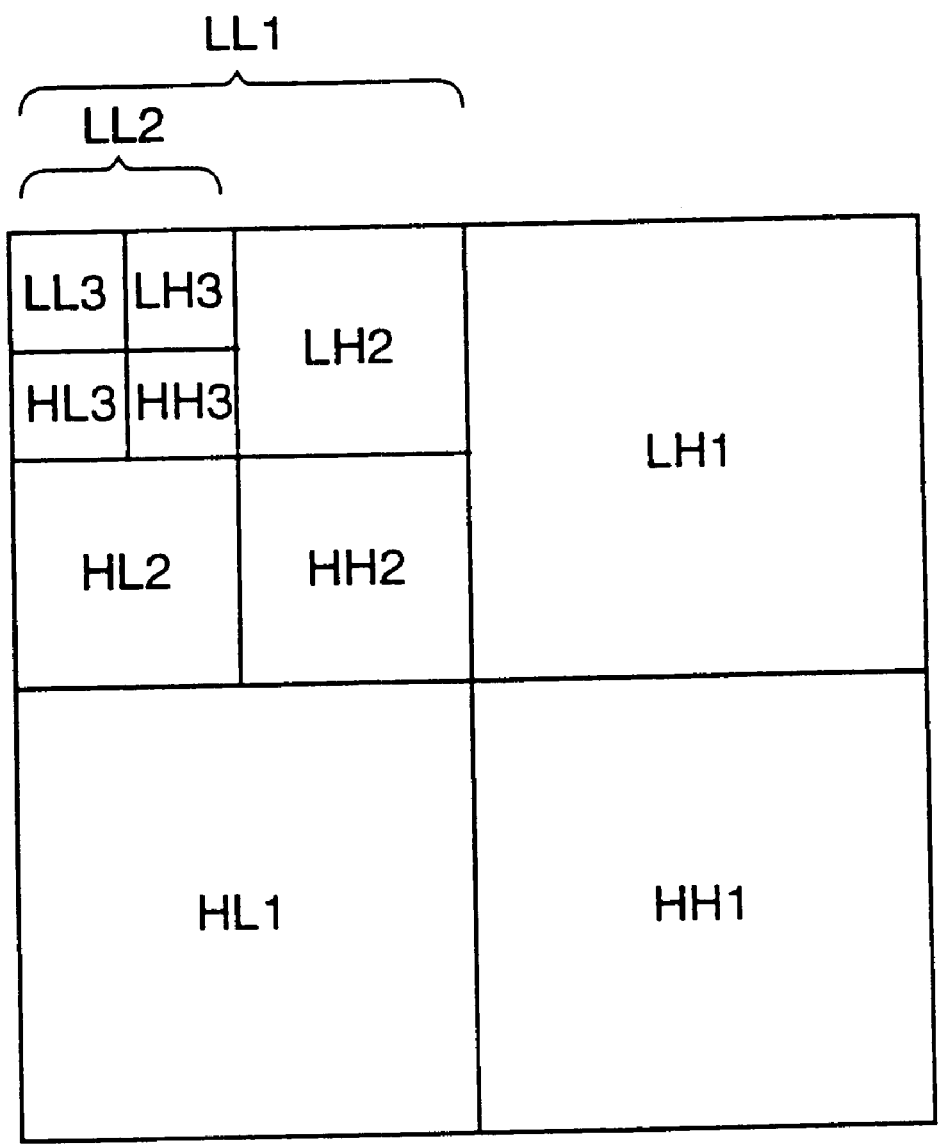
FIG. 3 is a diagram for explaining results of performing a three level decomposition.
Figure 6A:
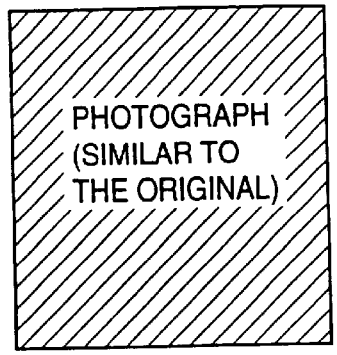
FIG. 6A, FIG. 6B and FIG. 6C are diagrams for explaining results of reconstructed images from the coded data produced by a conventional image data encoding method.
Figure 6B:
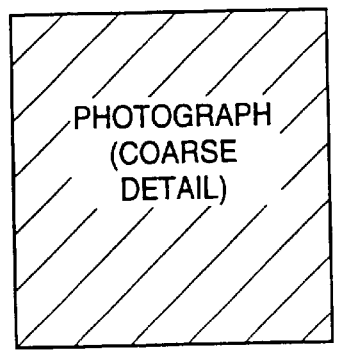
Figure 6C:
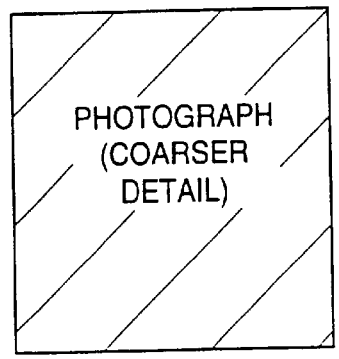

For example, FIG. 3 shows the results of performing a three level decomposition. Due to subsampling by two, each second level subband is one-sixteenth the size of the original image. Each sample (e.g., pixel) at this level represents moderate detail in the original image at the same location. Similarly, each third level subband is $\frac{1}{64}$ the size of the original image. Each pixel at this level corresponds to relatively coarse detail in the original image at the same location.

Since the decomposed images are physically smaller than the original image due to subsampling, the same memory used to store the original image can be used to store all of the decomposed subbands. In other words, the original image and decomposed subbands LL1 and LL2 are discarded and are not stored in a third level decomposition.

Although only four subband decomposition levels are shown in FIG. 2, additional levels could be developed in accordance with the requirements of a particular system.

Next, a description will be given of the operations of the text transform-A unit 12A and the text transform-B unit 12B in the present embodiment of the image data encoding apparatus.

Referring back to FIG. 1, in the present embodiment, one of two kinds of text transform is recursively applied to a selected text area of the original image by one of the text transform-A unit 12A and the text transform-B 12B, simultaneously with the reversible wavelet transform applied by the wavelet transform unit 10. Specifically, in the image data encoding apparatus of the present embodiment, in response to each selected block, the text transform-A unit 12A produces a series of coefficients representing a background, an intensity and a location of the image. Simultaneously, in response to each selected block, the text transform-B unit 12B produces a series of coefficients representing a background, an intensity and a location of the image.

As described above, when a block in the input image data meets the above requirements that the number of different pixel values in the block is two or less, and at least one of the different pixel values in the block is the maximum or the minimum, the selector 16 supplies the output data from one of the two text transform units 12A and 12B to the entropy coder 18. In the present embodiment, each block in the input image data consists of 2×2 pixels.

Similar to the wavelet transform unit 10, the input image data is decomposed into four coefficients (e.g., subbands HH, HL, LH and LL) by both the text transform-A unit 12A and the text transform-B unit 12B.

In the coefficients produced by each of the elements 12A and 12B, the background coefficient is a 1-bit parameter that indicates whether one of the different pixel values in the block is the maximum or the minimum. If it is the maximum, the background coefficient is set to the value "1". If it is the minimum, the background coefficient is set to the value "0". If the pixel values in the block are both the maximum and the minimum, the background coefficient is set to "0".

In the coefficients produced by each of the elements 12A and 12B, the intensity coefficient is an n-bit parameter that indicates a subsampled value of one of the pixels in the block which is neither the maximum nor the minimum. In a case of 8 bits per pixel, the intensity coefficient is an 8-bit parameter. Further, the location coefficient is a 4-bit parameter which indicates whether each of the values of the four pixels in the block is the maximum (or the minimum) or not. Each bit of the location coefficient corresponds to one of the four pixels of the block. If one pixel value in the block is the maximum, a corresponding bit of the location coefficient is set to the value "1". If one pixel value in the block is neither the maximum nor the minimum, a corresponding bit of the location coefficient is set to the value "0".

For the previously-described multiple decomposition of the wavelet transform unit 10, each of the succeeding second, third and fourth lower decomposition levels is produced by further decomposing the low frequency LL subband of the preceding level. The low frequency LL subband coefficient indicates an average of the values of the four pixels of the preceding-level block. Similarly, for a multiple decomposition of both the text transform-A unit 12A and the text transform-B unit 12B, each of the succeeding second, third and fourth lower decomposition levels is produced by further decomposing the low frequency LL subband of the preceding level (which contains the intensity coefficient only for the text transform-A case and contains no significant bits for the text transform-B case). The intensity coefficient indicates a subsampled value from one of the values of the four pixels of the preceding-level block. In both cases, the process of decomposing the original image involves subsampling by two, and resolution is halved at every stage.

In the present embodiment, the above-mentioned text transform is recursively applied by the selected one of the text transform-A unit 12A and the text transform-B 12B to the original image, simultaneously with the reversible wavelet transform applied by the wavelet transform unit 10.

FIG. 4A, FIG. 4B and FIG. 4C show respective arrangements of coefficients when the wavelet transform, the text transform-A and the text transform-B are applied to the input image data.

As shown in FIG. 4A, the wavelet transform coefficients, output from the selector 16 when the wavelet transform is applied by the wavelet transform unit 10, include a subband HH coefficient, a subband LH coefficient, a subband HL coefficient and a subband LL coefficient. The subband HH coefficient contains two elements: the area bit and the subband HH component. The area bit is produced from the above-mentioned area-discriminating signal supplied by the area discriminating unit 14, and it is added to the start position of the subband HH component. Each of the subband LH coefficient, the subband HL coefficient and the subband LL coefficient contains only a corresponding subsampled component.

As shown in FIG. 4B, the text transform-A coefficients, output from the selector 16 when the text transform-A is applied by the text transform-A unit 12A, include a subband HH coefficient, a subband LH coefficient, a subband HL coefficient and a subband LL coefficient.

The subband HH coefficient in this case contains three significant bits: the area bit, the background coefficient bit, and a tail-end bit. The 1-bit background coefficient bit is produced from the block of concern in the above-described manner. The area bit is produced from the area-discriminating signal supplied by the area discriminating unit 14, and it is added to the preceding position of the background coefficient bit. The tail-end bit is produced from the text-transform control signal, and it is added to the following position of the background coefficient bit. The tail-end bit indicates which of the text transform-A or the text transform-B is specified by the text-transform control signal for the block. In the present embodiment, if the text transform-A is specified, the tail-end bit is set to the value "0" (as in this case). If the text transform-B is specified, the tail-end bit is set to the value "1" (as in the following case). The remaining bits of the subband HH coefficient are not significant and they are discarded.

The subband LH coefficient in this case contains the 4-bit location coefficient which is produced from the block in the above-described manner. The remaining bits of the subband LH coefficient are not significant and they are discarded. The subband HL coefficient in this case contains no significant bits and it is discarded. The subband LL coefficient in this case contains the 8-bit intensity coefficient which is produced from the block of concern in the above-described manner.

As described above, the subband LL coefficient in the case of the text transform-A contains the intensity bits which are significant to the image data contained in the block. If the text transform-A is recursively applied to a text area of the original image, the readability of characters in the reconstructed images obtained by the progressive transmission will deteriorate since the resolution is increasingly lowered. Eventually, the characters become unreadable to a human viewer. Hence, it is important to determine how much loss of the readability is produced by varying the decomposition levels to which the text transform-A is applied.

As shown in FIG. 4C, the text transform-B coefficients, output from the selector 16 as the result of the application of the text transform-B to the block of concern in the input image data by the text transform-B unit 12B, include a subband HH coefficient, a subband LH coefficient, a subband HL coefficient and a subband LL coefficient.

The subband HH coefficient in this case contains three significant bits: the area bit, the background coefficient bit, and the tail-end bit. The 1-bit background coefficient bit is produced from the block of concern in the above-described manner. The area bit is produced from the area-discriminating signal supplied by the area discriminating unit 14, and it is added to the preceding position of the background coefficient bit. The tail-end bit is produced from the text-transform control signal, and it is added to the following position of the background coefficient bit. The remaining bits of the subband HH coefficient are not significant and they are discarded.

The subband LH coefficient in this case contains the 4-bit location coefficient which is produced from the block of concern in the above-described manner. The remaining bits of the subband LH coefficient are not significant and they are discarded. Unlike the text transform-A mentioned above, the subband HL coefficient in this case contains the 8-bit intensity coefficient which is produced from the block of concern in the above-described manner, and the subband LL coefficient in this case contains no significant bits and it is discarded.

As described above, the subband LL coefficient in the case of the text transform-B contains no significant bits. The subband HL coefficient in this case contains the intensity bits which are significant to the image data contained in the block. If the text transform-B is recursively applied to a text area of the original image, the bits related to the characters in the text area (which are contained in the subband HL coefficient) will be discarded from the transforms at the subsequent decomposition levels. The text transform-B unit 12B produces loss in the readability of the characters in the reconstructed images, but also can reduce the total amount of bits needed for the progressive transmission. Hence, it is possible for the image data encoding apparatus of the present embodiment to avoid the inclusion of the unreadable-character bits in the lower resolution images before the subsequent-level decomposition is performed.

Accordingly, by suitably setting the text transform control signal, the image data encoding apparatus of the present embodiment allows speedy searching and recognition of the reconstructed images obtained by the progressive transmission while avoiding the increase of the amount of the unreadable-character bits needed for the transmission. Further, by suitably setting the text transform control signal, the image data encoding apparatus of the present embodiment allows the reconstructed images obtained by the progressive transmission to have appropriate readability for a specific purpose such as viewing as a thumbnail for searching and recognition.

FIG. 5 shows the correspondence between the wavelet transform coefficients, the text transform-A coefficients and the text transform-B coefficients.

As shown in FIG. 5, the wavelet transform coefficients produced by the wavelet transform unit 10 of the image data encoding apparatus of the present embodiment include: the low frequency LL subband coefficient; the LH subband coefficient; the HL subband coefficient; and the HH subband coefficient. Hereinafter, the low frequency LL subband coefficient is called the first subband coefficient, and the other subband coefficients (LH, HL and HH) are called the second subband coefficients.

In comparison with the wavelet transform coefficients mentioned above, the text transform-A coefficients produced by the text transform-A unit 12A in the present embodiment includes the intensity coefficient as the first subband coefficient, and includes the location coefficient (or the LH subband coefficient) and the background coefficient and tail-end bit (or the HH subband coefficient) as the second subband coefficients. In the text transform-A coefficients, no LH subband coefficient is included. The text transform-B coefficients produced by the text transform-B unit 12B in the present embodiment includes the intensity coefficient (or the LH subband coefficient), the location coefficient (or the HL subband coefficient) and the background coefficient and tail-end bit (or the HH subband coefficient) as the second subband coefficients. In the text transform-B coefficients, no LL subband coefficient is included.

Figure 7A:
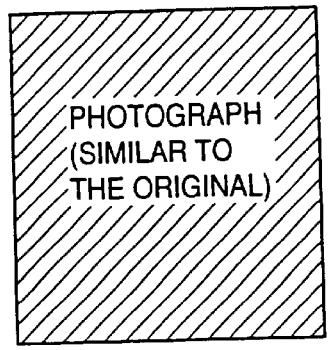
FIG. 7A, FIG. 7B and FIG. 7C are diagrams for explaining results of reconstructed images from the coded data produced by the image data encoding apparatus of the present invention.
Figure 7B:
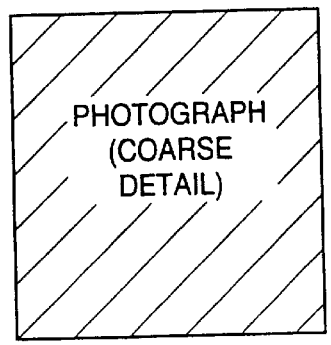
Figure 7C:
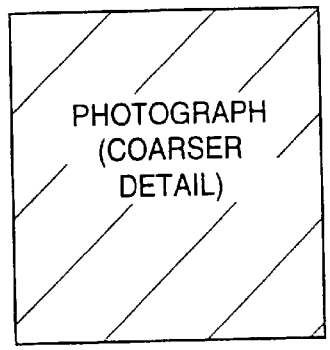
Figure 8A:
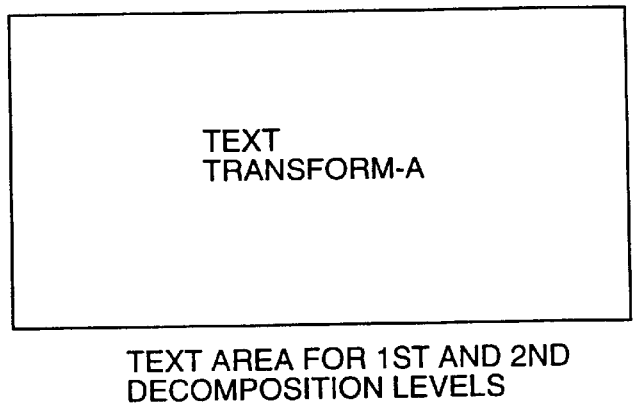
FIG. 8A, FIG. 8B and FIG. 8C are diagrams for explaining the relationship between text-transform control signal settings and text areas of an image in one embodiment of the image data encoding apparatus of the present invention.
Figure 8B:
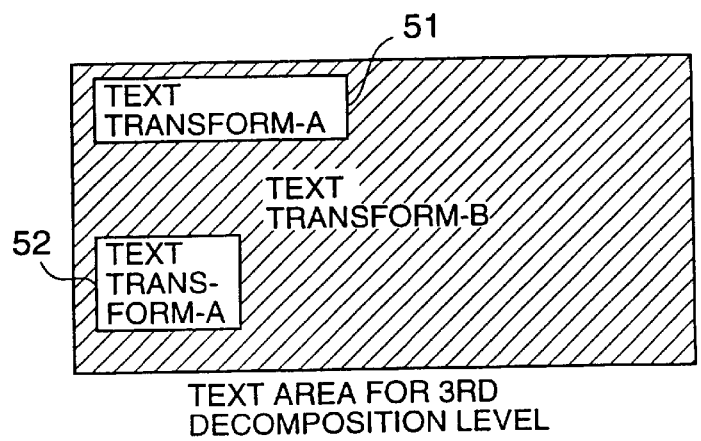
Figure 8C:
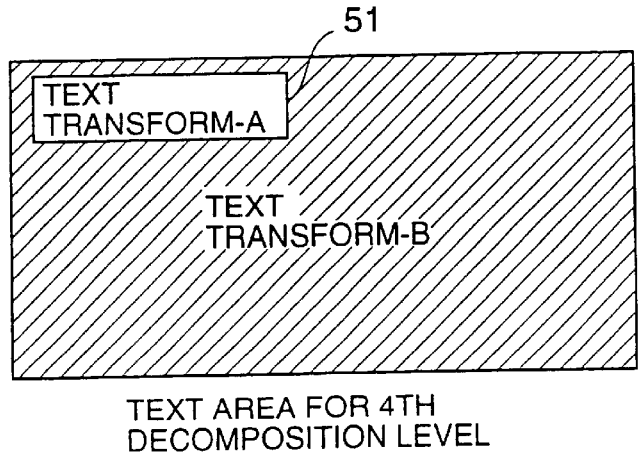

FIG. 7A, FIG. 7B and FIG. 7C show results of reconstructed images from the coded data produced by the image data encoding apparatus of the present invention. FIG. 8A, FIG. 8B and FIG. 8C show the relationship between text-transform control signal settings and text areas of an original image in one embodiment of the image data encoding apparatus of the present invention.

Specifically, FIG. 7A show a result of a reconstructed image based on the entire coded data of an original high-resolution image in which a photograph area and a text area coexist. In this case, the entropy coder 18 in the image data encoding apparatus of the present embodiment produces the coded data in response to the first-level through fourth-level bit streams of the entire original image as well as the low frequency LL subband bit stream of the entire original image (both the text area and the photographic area) output from the selector 16.

The photograph in the photograph area of the reconstructed image of FIG. 7A is similar to that in the same area of the original image since the reconstructed image is based on the entire coded data.

As shown in FIG. 8A, in the present embodiment of the image data encoding apparatus, when the first and second decomposition levels are performed to the original image, the text transform control signal, which is supplied to the selector 16, is set to specify the text transform-A (or the tail-end bit=the value "0") for all of the text areas of the original image.

As shown in FIG. 8B, in the present embodiment, when the third decomposition level is performed, the text transform control signal is set to specify the text transform-A (or the tail-end bit=the value "0") for text areas 51 and 52 of the original image and is set to specify the text transform-B (or the tail-end bit=the value "1") for the remaining text areas of the original image. Suppose, in this case, that the text areas 51 and 52 contain important words in the original document, and the remaining text areas contain negligible words in the original document.

FIG. 7B shows a result of a reconstructed low-resolution image based on the fourth-level coded data (HH4, HL4, LH4) and the low-frequency coded data (LL4) of the original image. In accordance with the text transform control signal settings of FIG. 8B, the results of the text transform-A are produced for the text areas 51 and 52 of the original image and the results of the text transform-B are produced for the remaining text areas of the original image. Only the characters in the text areas 51 and 52 of the reconstructed image are readable to a human viewer, and the characters in the remaining text areas of the reconstructed image are eliminated.

Accordingly, by suitably setting the text transform control signal, the image data encoding apparatus of the present embodiment allows the reconstructed image obtained by the progressive transmission to have appropriate readability for a specific purpose such as viewing as a thumbnail for searching and recognition.

The photograph in the photograph area of the reconstructed image of FIG. 7B shows a coarse detail of the original image since the reconstructed image is based on the fourth-level coded data (HH4, HL4, LH4) and the low-frequency coded data (LL4) of the original image.

As shown in FIG. 8C, in the present embodiment, when the four decomposition level is performed, the text transform control signal is set to specify the text transform-A only for the text area 51 and is set to specify the text transform-B for the text area 52 and the remaining text areas of the original image. Suppose, in this case, that the text area 51 contains a title in upper-case characters that will be readable to a human viewer even if a further transform is performed, and the text area 52 contains lower-case characters which will not be readable to a human viewer if a further transform is performed.

FIG. 7C shows a result of a reconstructed lower-resolution image based on only the low-frequency coded data (LL4) of the original image. In accordance with the text transform control signal settings of FIG. 8C, the result of the text transform-A is produced only for the text area 51 of the original image and the results of the text transform-B are produced for the remaining text areas of the original image. Only the characters in the text area 51 of the reconstructed image are readable to a human viewer, and the characters in the remaining text areas (including the text area 52) of the reconstructed image are eliminated. The photograph in the photograph area of the reconstructed image of FIG. 7C shows a coarser detail of the original image since the reconstructed image is based only on the low-frequency coded data (LL4) of the original image.

Hence, by suitably setting the text transform control signal, the image data encoding apparatus of the present embodiment allows speedy searching and recognition of the reconstructed images obtained by the progressive transmission. It is possible for the image data encoding apparatus of the present embodiment to prevent the increase of the amount of the unreadable-character bits needed for the progressive transmission, which allows speedy transmission of the compressed image data to the receiver equipment.

The present invention is not limited to the above-described embodiments, and variations and modifications may be made without departing from the scope of the present invention.

Further, the present invention is based on Japanese priority application No.10-375463, filed on Dec. 14, 1998, the entire contents of which are hereby incorporated by reference.

What is claimed is:

1. A multi-resolution image encoding apparatus comprising:

a multiple decomposition unit configured to recursively generate a plurality of subband coefficients as an output in response to each block of input image data, each block having a predetermined number of pixels, the plurality of subband coefficients including a first subband coefficient and a second subband coefficient which are produced by performing a multiple decomposition process in which the first subband coefficient is further decomposed and the second subband coefficient is not further decomposed;

a first text transform unit configured to generate an intensity coefficient of a first kind and a set of coefficients of a second kind as an output in response to said each block of the input image data, the intensity coefficient including significant bits and being further decomposed through a multiple decomposition process without further decomposing any of the coefficients of the second kind; and a second text transform unit configured to generate a set of coefficients of the second kind as an output in response to said each block of the input image data without producing any coefficient of the first kind, one of the coefficients of the second kind including at least one significant bit but not being further decomposed, wherein one of the outputs of the first text transform unit and the output of the second text transform unit is selected as an input to a subsequent-stage device in accordance with a text-transform control signal, and the text-transform control signal is predetermined with respect to each of successive decomposition levels below a given resolution, so as to apply a selected one of the first text transform unit and the second text transform unit to respective text areas of an original image corresponding to the input image data.

2. A multi-resolution image encoding apparatus comprising:

a multiple decomposition unit configured to recursively generate a plurality of subband coefficients as an output in response to each block of input image data, each block having a predetermined number of pixels, the plurality of subband coefficients including a first subband coefficient and a second subband coefficient which are produced by performing a multiple decomposition process in which the first subband coefficient is further decomposed and the second subband coefficient is not further decomposed;

a first text transform unit configured to generate an intensity coefficient of a first kind and a set of coefficients of a second kind as an output in response to said each block of the input image data, the intensity coefficient including significant bits and being further decomposed through a multiple decomposition process without further decomposing any of the coefficients of the second kind; and a second text transform unit configured to generate a set of coefficients of the second kind as an output in response to said each block of the input image data without producing any coefficient of the first kind, one of the coefficients of the second kind including significant bits but not being further decomposed, wherein one of the outputs of the multiple decomposition unit, the first text transform unit and the second text transform unit is selected as an input to a subsequent-stage device in accordance with an area-discriminating signal that is produced in response to said each block of the input image data, and the area-discriminating signal is indicative of whether the block is located in a text area of an original image corresponding to the input image data.

* * * * *

UNITED STATES PATENT AND TRADEMARK OFFICE
CERTIFICATE OF CORRECTION

PATENT NO. : 6,683,990 B2
DATED : January 27, 2004
INVENTOR(S) : Yagishita et al.

It is certified that error appears in the above-identified patent and that said Letters Patent is hereby corrected as shown below:

<u>Title page</u>,
Item [63], Related U.S. Application Data, should read:
--          Related U.S. Application Data
     [63] Continuation of application No. 09/455,923, filed on Dec. 7, 1999, now Pat. No. 6,507,674. --

Signed and Sealed this

Sixteenth Day of March, 2004

JON W. DUDAS
*Acting Director of the United States Patent and Trademark Office*